(12) United States Patent
Klein et al.

(10) Patent No.: US 8,046,491 B2
(45) Date of Patent: *Oct. 25, 2011

(54) METHOD FOR EXCHANGING CONTENT BETWEEN COMMUNICATION DEVICES

(75) Inventors: Adam Klein, Cedar Park, TX (US); David Wolter, Austin, TX (US); Dinesh Nadarajah, Austin, TX (US); Rias Muhamed, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 155 days.

This patent is subject to a terminal disclaimer.

(21) Appl. No.: 12/339,422

(22) Filed: Dec. 19, 2008

(65) Prior Publication Data

US 2009/0106346 A1    Apr. 23, 2009

Related U.S. Application Data

(63) Continuation of application No. 11/293,944, filed on Dec. 5, 2005, now Pat. No. 7,469,269.

(51) Int. Cl.
*G06F 15/16* (2006.01)
*G06F 12/00* (2006.01)

(52) U.S. Cl. ........................................ 709/239; 709/203

(58) Field of Classification Search .......... 709/217–218, 709/203, 223–229, 239, 250
See application file for complete search history.

(56) References Cited

U.S. PATENT DOCUMENTS

| 6,771,761 | B1 | 8/2004 | LaPierre |
| 6,975,855 | B1 | 12/2005 | Wallenius |
| 7,212,979 | B1 * | 5/2007 | Matz et al. ..................... 705/1.1 |
| 7,239,873 | B2 * | 7/2007 | Kawashima et al. ...... 455/435.1 |
| 7,469,269 | B2 * | 12/2008 | Klein et al. ..................... 709/203 |
| 2002/0065778 | A1 | 5/2002 | Bouet et al. |
| 2002/0196919 | A1 | 12/2002 | Ruckart et al. |
| 2004/0202299 | A1 | 10/2004 | Schwartz |
| 2005/0022033 | A1 | 1/2005 | Han |
| 2005/0188399 | A1 * | 8/2005 | Tischer ........................ 725/34 |
| 2005/0239505 | A1 | 10/2005 | Jeannerod |
| 2005/0267750 | A1 * | 12/2005 | Steuer et al. .................. 704/231 |
| 2009/0070464 | A1 * | 3/2009 | Ehrich et al. .................. 709/224 |

* cited by examiner

*Primary Examiner* — Zarni Maung
(74) *Attorney, Agent, or Firm* — Douglas Schnabel; Guntin Meles & Gust, PLC

(57) ABSTRACT

A system that incorporates teachings of the present disclosure may include, for example, a communication device having a controller to request from an alternate communication device a log of subscribed content acquired by the alternate communication device from an alternate source, identify from the log a desired portion of the subscribed content, and transmit to the alternate communication device a peer-to-peer request for the desired portion of the subscribed content according to one or more available subscriptions. Additional embodiments are also disclosed.

20 Claims, 3 Drawing Sheets

METHOD FOR EXCHANGING CONTENT BETWEEN COMMUNICATION DEVICES

CROSS-REFERENCE TO RELATED APPLICATIONS

This application is a continuation of U.S. patent application Ser. No. 11/293,944, filed Dec. 5, 2005, the disclosure of which is hereby incorporated by reference.

FIELD OF THE DISCLOSURE

The present disclosure relates generally to content management, and more specifically to a method for exchanging content between communication devices.

BACKGROUND

Cellular communications, among other wireless technologies such as Bluetooth™, WiFi, and WiMax, has made it possible to receive content such as news reports, music, wallpaper, ring tones, and video over the air. These technologies, however, are susceptible to common interference issues. For example, a cellular phone may have poor reception or no reception at all when an end user parks in an underground facility, or when roaming in a dense building. Communication devices utilizing short-range communications technologies such as Bluetooth™, and WiFi, can be out of range from a wireless access point that provides accessibility to the communication system.

DETAILED DESCRIPTION

An embodiment of the present disclosure entails a computer-readable storage medium in a communication device having computer instructions to scan for an alternate communication device, detect the alternate communication device with subscribed content acquired from an alternate content source, and transmit to the alternate communication device a peer-to-peer request for a portion of the subscribed content according to one or more subscriptions associated with the communication device.

Another embodiment of the present disclosure entails a communication device having a controller to request from an alternate communication device a log of subscribed content acquired by the alternate communication device from an alternate source, identify from the log a desired portion of the subscribed content, and transmit to the alternate communication device a peer-to-peer request for the desired portion of the subscribed content according to one or more available subscriptions.

Yet another embodiment of the present disclosure entails identifying a portion of subscribed content in the alternate device which a communication device is subscribed to, and submitting to the alternate device a request for the portion of subscribed content. The request can include one or more subscription identifications.

Another embodiment of the present disclosure entails a communication device having a controller to informing another communication device about subscriber-based content stored in the communication device, and receiving a request from the other communication device to transmit a portion of the subscriber-based content, wherein the request includes one or more subscription identifications.

Figure 1:
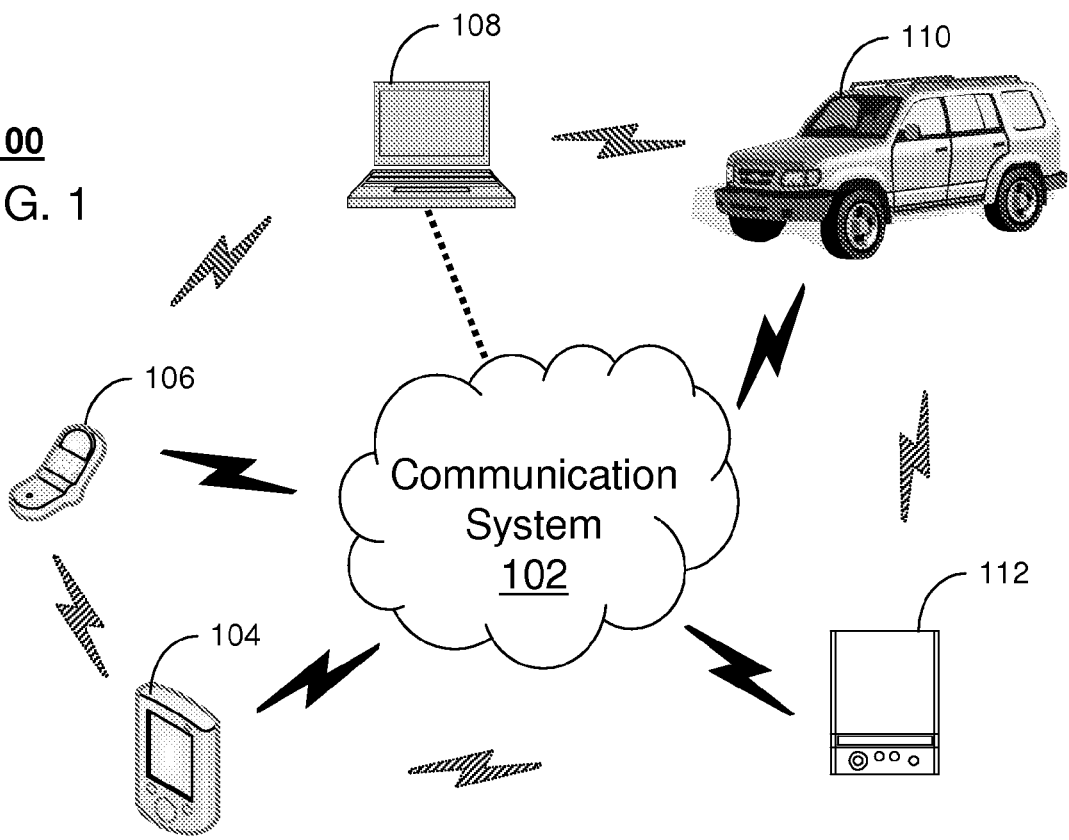
FIG. 1 is a block diagram of a plurality of communication devices interacting with a communication system and each other according to teachings of the present disclosure.

FIG. 1 is a block diagram of a plurality of communication devices 104-112 interacting with a communication system 102 and each other according to teachings of the present disclosure. The communication system 102 provides wired and wireless services including, but not limited to, multimedia content services, POTS (Plain Old Telephone Service), VoIP (Voice over Internet communications, IPTV (Internet Protocol Television), broadband communication services, and cellular services. The access technologies of the communication system 102 include wired telephony, and a wide range of wireless technologies such as cellular telephony, WiFi, WiMax, Bluetooth™, infra-red, and other known or future wired and wireless access technologies.

Multimedia content services can include downloadable content such as music, games, ring tones, video, news reports, magazines, books, software, and any other downloadable content. The downloadable content can include in part subscribed content with security appended thereon (such as digital rights management—DRM—to protect copyrighted content). The downloadable content can be free of charge once a user is subscribed to a corresponding service, or the user can be charged a periodic fee (e.g., monthly subscription fee) or can be charged according to the content item downloaded. Alternatively, or in addition to, the downloadable content can include unsubscribed content that is available to the public free of charge in most instances without DRM protection.

Each of the communication devices 104-112 can download content from the multimedia services supported by the communication system 102 according to any one of the aforementioned access technologies. In some use cases, the communication devices can be represented by a single mode device that supports a short range wireless access technology such as WiFi, WiMax, or Bluetooth™, or a wired access technology such as Ethernet, or POTS using a common modem. In other use cases, the communication devices can be represented by a multimode communication device capable of, for example, cellular telephony and WiFi, or a hybrid wired and wireless access technology such as Ethernet and WiFi, respectively.

A communication device can be represented by a personal digital assistant (PDA) 104 (such as a Blackberry™, or an iPOD™), a cell phone 106, a laptop computer 108, a telematics system 110 of an automobile (supporting video, radio broadcasts, and navigation services, just to mention a few), and a gaming device 112 such as a GameBoy™, or other suitable device for playing 2D or 3D games. Each of these devices has at least one access technology for communicating with the communication system 102 and/or each other. Although connectivity between the communication devices 104-112 can be accomplished with an infrared technology or direct tethering with an accessory cable, or docking device, for the present illustration, all devices are assumed to support at least a WiFi access technology. The laptop computer 108, in this illustration will support wired Ethernet along with WiFi. All other communication devices will utilize WiFi exclusively (e.g., the telematics system 110) and/or cellular telephony.

Figure 2:
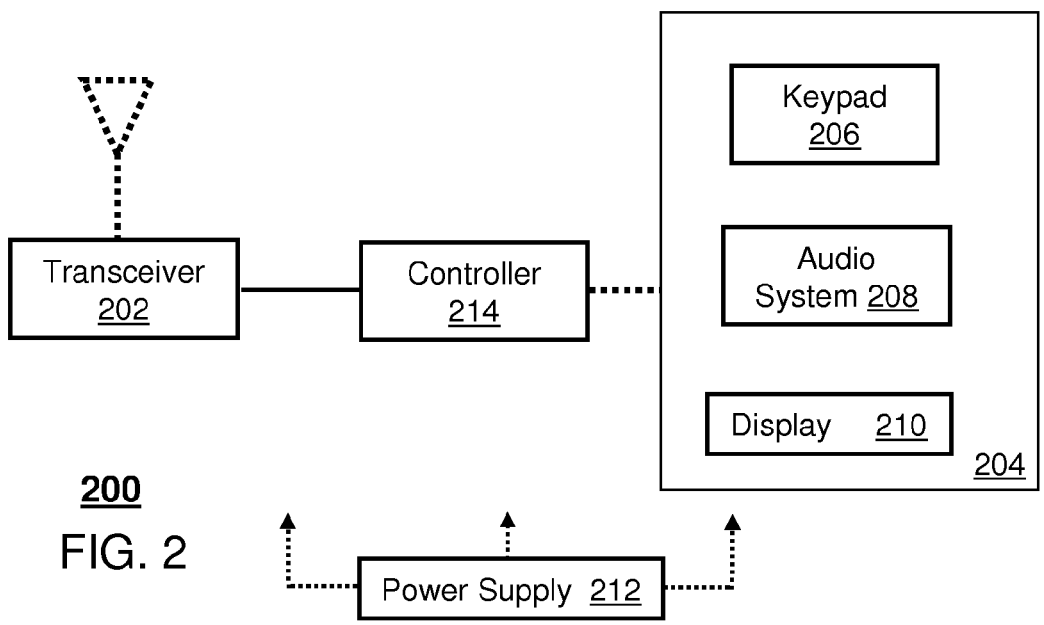
FIG. 2 is a block diagram of common technologies that can be utilized in the communication devices of FIG. 1 according to teachings of the present disclosure.

FIG. 2 is a block diagram of common technologies that can be utilized in the communication devices 104-112 (collectively identified as reference 200) of FIG. 1 according to teachings of the present disclosure. A communication device 200 can include a transceiver 202 and a controller 214 for managing operations thereof. The transceiver 202 can utilize common technology to support any of the wired or wireless access technologies described above for the communication system 102. The controller 214 can be represented by a microprocessor and/or a digital signal processor with associated storage devices such as Flash memory, RAM, ROM, DRAM, a hard disk, or other suitable storage media.

In a supplemental embodiment, the communication device 200 can further include a user interface (UI) 204, and a portable power supply 212. The UI 204 can include a keypad 206 with navigation for manipulating operations of the communication device 200 and for navigating through images conveyed by a common display 210 such as an LCD (Liquid Crystal Display). The UI 204 can further include an audio system 208 for intercepting and conveying audio messages to an end user of the communication device 200. The power supply 212 can utilize common technology such as rechargeable batteries with a charger for supply energy to the components of the communication device 200, and for recharging said batteries after they have expired.

Figure 3:
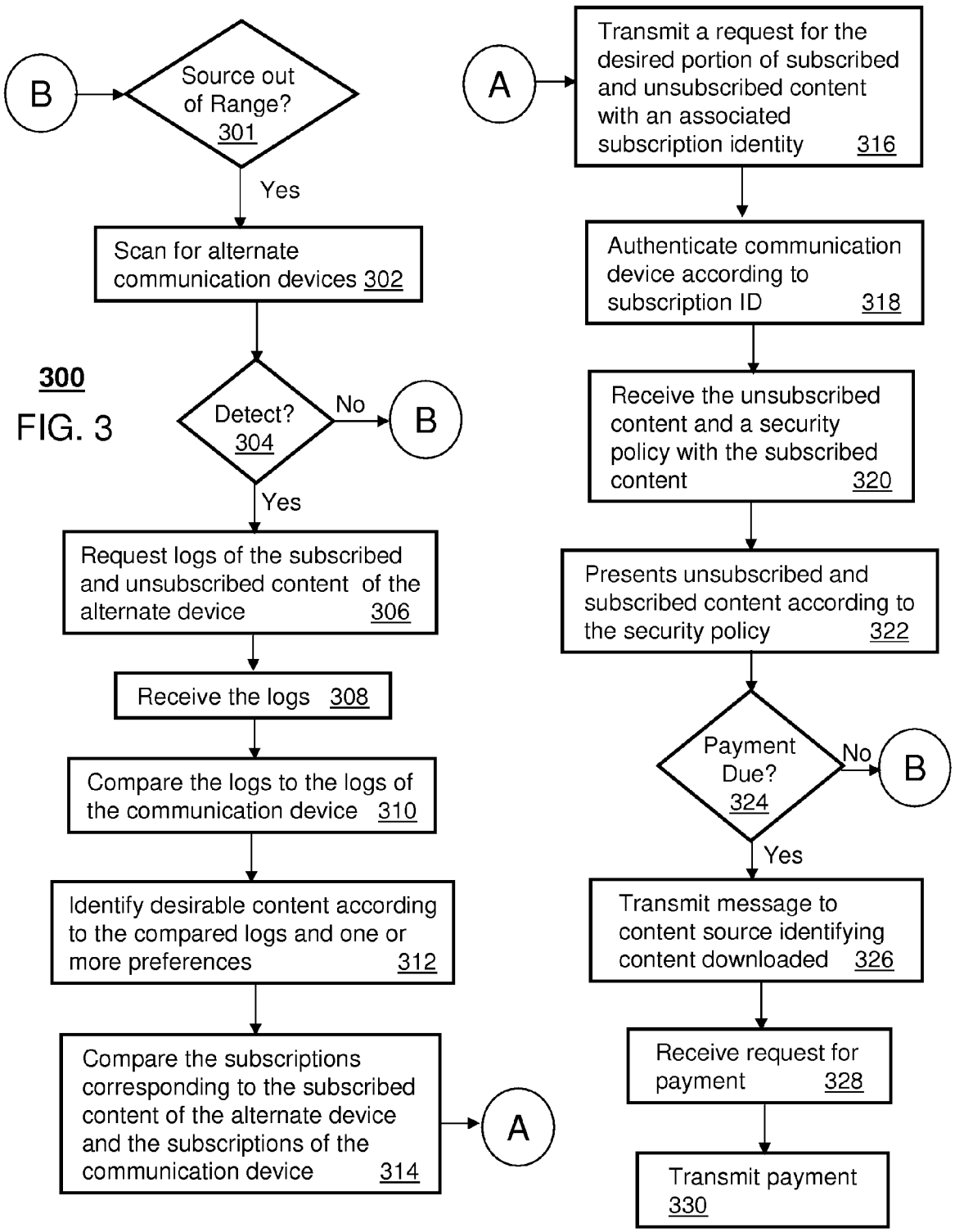
FIG. 3 depicts a flowchart of a method operating in each of the communication devices according to teachings of the present disclosure.

FIG. 3 depicts a flowchart of a method 300 operating in each of the communication devices 104-112 according to teachings of the present disclosure. Method 300 begins with step 301 where the controller 214 of the communication device 200 checks whether an alternate content source such as the communication system 102 is out of range. If the communication system 102 is within range, the controller 214 retrieves desired subscribed and unsubscribed content therefrom according to common means. If, however, the communication system 102 is out of range, the controller 214 can be programmed to cause in step 302 the transceiver 202 to scan for alternate communication devices (such as devices 104-112 shown in FIG. 1). As noted earlier, the transceiver 202 can perform this task over a physical medium (such as a cable tethered between communication devices 200) or by wireless means such as Bluethooth™, infrared, or WiFi. For convenience, the communication devices 200 are assumed to have at least WiFi capability.

If an alternate communication device is detected in step 304 (e.g., the PDA 104 and the telematics system 110 detect each other), the controller 214 proceeds to step 306 where it requests a log of the subscribed and unsubscribed content of the alternate device. If no alternate devices are detected, the controller 214 proceeds to step 301 to check availability of the communication system 102. This and the subsequent steps of method 300 can be shared by both devices. That is, the PDA 104 and the telematics system 110 can be submitting this request to each other in order to survey each other's content. It should also be noted that the subscribed and unsubscribed content in the alternate device is assumed in the present illustration to have been acquired from an alternate source such as the communication system 102 rather than one of the peer devices (104-112) shown in FIG. 1. In step 308, the controller 214 receives the logs, and begins to compare the logs in step 310 to its own logs. The controller 214 can identify in step 312 desirable content according to the comparison of the logs and one or more preferences established by an end user of the communication device 200.

The preferences can be established by the end user by way of, for example, UI settings embedded in a menu selected by the end user with the keypad. Alternatively, the preferences can be programmed by way of a computer tethered to the communication device 200 operated on with common provisioning software that generally comes with the purchase of the device. For more sophisticated communication devices 200, the preferences can be programmed over-the-air (e.g., with an SMS—short message system) after they have been entered at a website managed by, for example, a content provider and/or the manufacturer of the communication device 200.

The preferences can be defined according to, for example, one or more content types, and one or more content preferences (e.g., a preference for music over news clips). The newness of the content, and the storage and processing capacity of the communication device 200 can also play a role. For example, if a news clip is more than a day old, the end user may not be interested in requesting for such content. On the other hand, if the content is music, time may not be a factor to the end user. The storage capacity of the communication device 200 may be low, in which case music files can, for example, take priority over news files, unless there is not enough space for music in which case the next priority content is considered. Similarly, if the processing capacity of the communication device 200 is such that it cannot process video, but it can process other multimedia files, video is excluded from consideration. Additionally, the end user can define a preference for disallowing file transfers that take too long (e.g., more than 15 seconds).

It would be apparent to an artisan with ordinary skill in the art that there are innumerable possibilities for establishing preferences for desirable content within the scope of operation of the present disclosure. These undisclosed embodiments can best be understood by the description of the claims noted below.

Once desirable content has been identified in step 312, the controller 214 proceeds to step 314 where it compares the subscriptions corresponding to the subscribed content of the alternate device with its own subscriptions. The subscriptions of the subscribed content of the alternate device can be embedded, for example, in the logs (e.g., National Public Radio (NPR) news articles, Sports Illustrated news articles, Nintendo software applications, and so on). In step 316, the controller 214 transmits a peer-to-peer request to the alternate device for the desired portion of subscribed content which the end user has one or more subscriptions, and a portion of unsubscribed content. The controller 214 transmits in the same step one or more subscription IDs. In step 318, the alternate device authenticates the communication device 200 according to the subscription IDs transmitted in step 316. The subscription ID can be any means for the alternate device to identify that the end user has a subscription to the same service. For example, the subscription ID can be a code only known by subscribers. This ID can be supplied to the communication device 200 by the content source once the end user has subscribed to the service.

Upon a valid authentication, the controller 214 proceeds to step 320 and receives the unsubscribed content along with a security policy attached to the subscribed content. The security policy can be, for example, a DRM policy to prevent copying or forwarding of the content, and to limit the time of use of said content. In step 322, the controller 214 presents by way of the UI 204 the unsubscribed content, and the subscribed content according to the security policy. The presentation of the content can be visual and/or audible depending on the content type.

When the controller 214 determines in step 324 that the subscribed content requires payment, it proceeds to steps 326-330 to complete the payment transaction. Otherwise, the controller 214 proceeds to step 301 to check for availability of the communication system 102. Step 324 can be the result of, for example, the DRM policy indicating that payment is due in order to enable processing of the content as desired by the end user. Once this determination is made, the controller 214 can be programmed to transmit in step 326 a message to the content source by way of the communication system 102 (once it becomes available) identifying the content that was downloaded. In step 328 the controller 214 can receive a request for payment from the content source corresponding to the downloaded content. In step 330, the controller 214 can transmit an electronic payment to the content source authorizing it to charge the requested amount. This step can be a payment process such as by way of a credit card profile, or other electronic payment means such as PayPal™. Steps 324-330 are obviously not required for subscribed content that is free payment.

Method 300 can be modified or supplemented in several ways without departing from the spirit and scope of the claims described below. For instance, method 300 can be modified so that subscribed content can be encrypted with keys only known to subscribers. Under this embodiment, encrypted subscriber content can be retrieved from any communication device by anyone whether or not the person retrieving the content is a subscriber. However, only subscribers will have the appropriate decryption keys to experience the content. Non-subscribers can acquire the encryption key(s) by paying a subscription and/or becoming members of the service. It should also be noted that method 300 can be applied to any of the alternate communication devices 104-112 of FIG. 1. Accordingly, each of these devices 103-112 can request for peer-to-peer exchange of subscribed and unsubscribed content (as described above) from each other under any circumstances including when the communication system 102 is out of the communication range of these devices.

Figure 4:
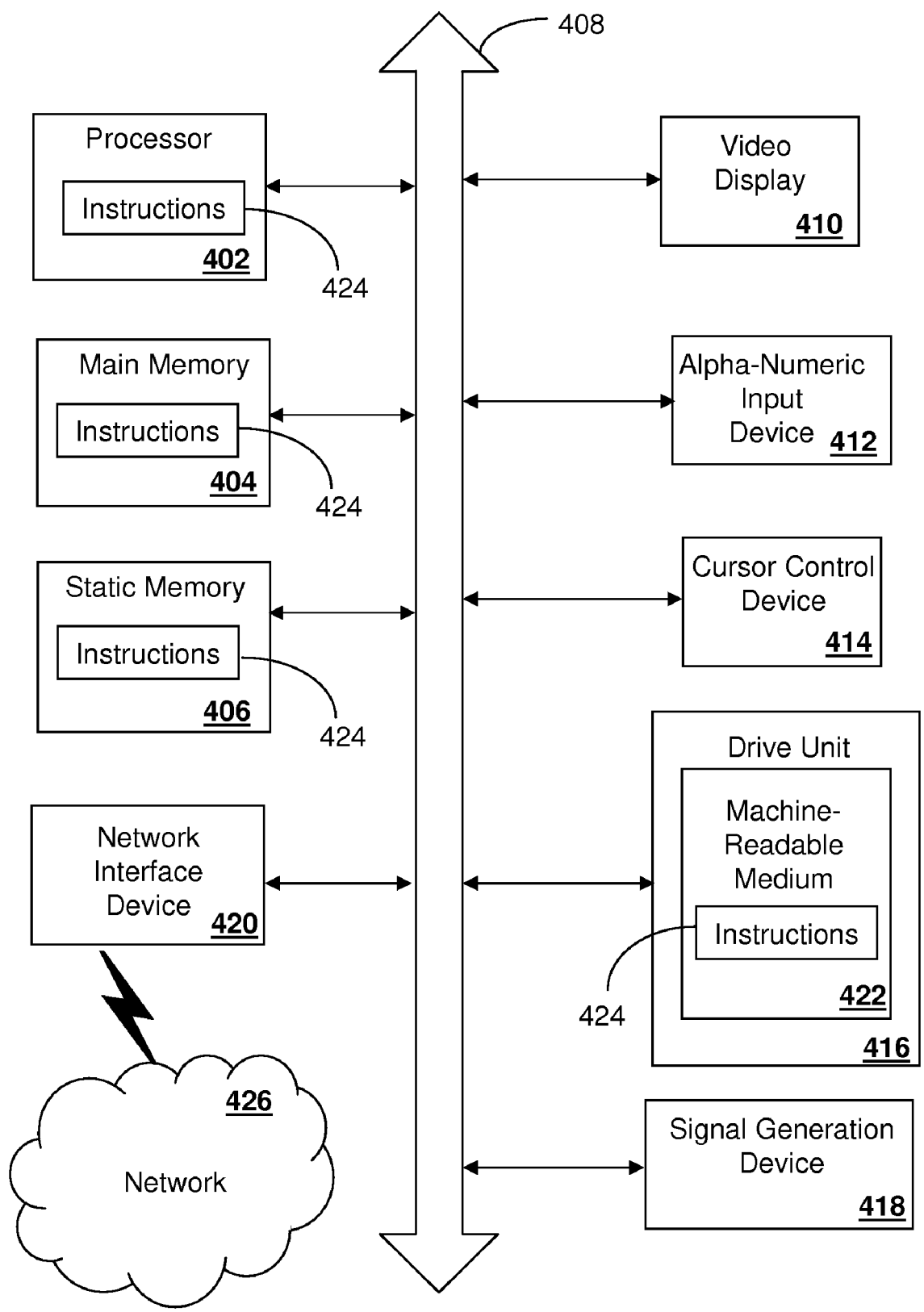
FIG. 4 is a diagrammatic representation of a machine in the form of a computer system within which a set of instructions, when executed, may cause the machine to perform any one or more of the methodologies discussed herein.

FIG. 4 is a diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU), or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method in a communication device, comprising:
   identifying a portion of subscribed content in an alternate device which the communication device is subscribed to; and
   submitting to the alternate device a request for the portion of subscribed content, wherein the request includes one or more subscription identifications for enabling the alternate device to authenticate the communication device according to the one or more subscription identifications.

2. The method of claim 1, comprising:
   requesting a log of subscribed content from the alternate device;
   comparing the log of the alternate device to a log of content in the communication device;
   identifying the portion of the subscribed content based on the comparison of logs; and
   receiving the portion of the subscribed content from the alternate device.

3. The method of claim 1, comprising:
   detecting in the alternate device one or more subscriptions corresponding to the subscribed content;
   comparing the one or more subscriptions associated with the alternate device to one or more subscriptions associated with the communication device; and
   identifying the one or more subscription identifications based on the comparison.

4. The method of claim 1, comprising selecting the portion of subscribed content according to unavailable content in the communication device.

5. The method of claim 1, comprising:
   identifying unavailable content based on a comparison of the subscribed content to content available in the communication device; and
   selecting the portion of the subscribed content based on a comparison of the unavailable content and at least one among one or more content types, one or more content preferences, newness of the content, storage and processing capacity of the communication device, and time to retrieve content from the alternate device.

6. The method of claim 1, comprising transmitting the one or more subscription identifications to the alternate device to enable transmission of the portion of the subscribed content.

7. The method of claim 1, wherein the communication device corresponds to one of a landline phone, a mobile phone, a computer, a media player, a gaming console, and a telematics system, and wherein the communication device is communicatively coupled to the alternative device by way of one of a wired interface and a wireless interface.

8. A communication device, comprising a controller operable to:
   identify a portion of subscribed content in an alternate device which the communication device is subscribed to; and
   submit to the alternate device a request for the portion of subscribed content, wherein the request includes one or more subscription identifications for enabling the alternate device to authenticate the communication device according to the one or more subscription identifications.

9. The communication device of claim 8, wherein the controller is operable to:
   request a log of subscribed content from the alternate device;
   compare the log of the alternate device to a log of content in the communication device;
   identify the portion of the subscribed content based on the comparison of logs; and
   receive the portion of the subscribed content from the alternate device.

10. The communication device of claim 8, wherein the controller is operable to:
    detect in the alternate device one or more subscriptions corresponding to the subscribed content;

compare the one or more subscriptions associated with the alternate device to one or more subscriptions associated with the communication device; and identify the one or more subscription identifications based on the comparison.

11. The communication device of claim 8, wherein the controller is operable to select the portion of subscribed content according to unavailable content in the communication device.

12. The communication device of claim 8, wherein the controller is operable to:

identify unavailable content based on a comparison of the subscribed content to content available in the communication device; and select the portion of the subscribed content based on a comparison of the unavailable content and at least one among one or more content types, one or more content preferences, newness of the content, storage and processing capacity of the communication device, and time to retrieve content from the alternate device.

13. The communication device of claim 8, wherein the controller is operable to transmit the one or more subscription identifications to the alternate device to enable transmission of the portion of the subscribed content.

14. The communication device of claim 8, wherein the communication device corresponds to one of a landline phone, a mobile phone, a computer, a media player, a gaming console, and a telematics system, and wherein the communication device is communicatively coupled to the alternative device by way of one of a wired interface and a wireless interface.

15. A non-transitory computer-readable storage medium in a communication device, comprising computer instructions to:

identify a portion of subscribed content in an alternate device which the communication device is subscribed to; and submit to the alternate device a request for the portion of subscribed content, wherein the request includes one or more subscription identifications for enabling the alternate device to authenticate the communication device according to the one or more subscription identifications.

16. The non-transitory computer-readable storage medium of claim 15, comprising computer instructions to:

request a log of subscribed content from the alternate device;

compare the log of the alternate device to a log of content in the communication device;

identify the portion of the subscribed content based on the comparison of logs; and receive the portion of the subscribed content from the alternate device.

17. The non-transitory computer-readable storage medium of claim 15, comprising computer instructions to: detect in the alternate device one or more subscriptions corresponding to the subscribed content;

compare the one or more subscriptions associated with the alternate device to one or more subscriptions associated with the communication device; and identify the one or more subscription identifications based on the comparison.

18. The non-transitory computer-readable storage medium of claim 15, comprising computer instructions to select the portion of subscribed content according to unavailable content in the communication device.

19. The non-transitory computer-readable storage medium of claim 15, comprising computer instructions to:

identify unavailable content based on a comparison of the subscribed content to content available in the communication device; and select the portion of the subscribed content based on a comparison of the unavailable content and at least one among one or more content types, one or more content preferences, newness of the content, storage and processing capacity of the communication device, and time to retrieve content from the alternate device.

20. The non-transitory computer-readable storage medium of claim 15, comprising computer instructions to transmit the one or more subscription identifications to the alternate device to enable transmission of the portion of the subscribed content.

* * * * *